US012312228B2

(12) United States Patent
Mills et al.

(10) Patent No.: US 12,312,228 B2
(45) Date of Patent: May 27, 2025

(54) BEVERAGE DEVICES, SYSTEMS, AND METHODS

(71) Applicant: B/E AEROSPACE, INC., Winston Salem, NC (US)

(72) Inventors: Brian P. Mills, Blue Springs, MO (US); Bryan Rogers, Kearney, MO (US); Mudar Abu-Saymeh, Olathe, KS (US)

(73) Assignee: B/E AEROSPACE, INC., Winston Salem, NC (US)

( * ) Notice: Subject to any disclaimer, the term of this patent is extended or adjusted under 35 U.S.C. 154(b) by 1 day.

(21) Appl. No.: 18/366,561

(22) Filed: Aug. 7, 2023

(65) Prior Publication Data

US 2023/0399218 A1 Dec. 14, 2023

Related U.S. Application Data

(62) Division of application No. 17/458,007, filed on Aug. 26, 2021, now Pat. No. 11,760,619.

(51) Int. Cl.
*B67D 1/00* (2006.01)
*B67D 1/08* (2006.01)

(52) U.S. Cl.
CPC ......... *B67D 1/0032* (2013.01); *B67D 1/0044* (2013.01); *B67D 1/0058* (2013.01); *B67D 1/0888* (2013.01)

(58) Field of Classification Search
CPC .. B67D 1/0032; B67D 1/0044; B67D 1/0058; B67D 1/0888; B67D 1/0078; B67D 1/1204; B67D 2210/00031; B67D 2210/00139; B67D 1/0057; B67D 1/0034
See application file for complete search history.

(56) References Cited

U.S. PATENT DOCUMENTS

| | | | |
|---|---|---|---|
| 2,612,304 | A | 9/1952 | Nissen |
| 2,655,858 | A | 10/1953 | Hamlin |
| 3,881,636 | A | 5/1975 | D'Aubreby |
| 3,949,902 | A | 4/1976 | Thompson |
| 4,804,112 | A | 2/1989 | Jeans |
| 5,411,179 | A | 5/1995 | Oyler et al. |
| 5,765,726 | A | 6/1998 | Jones |
| 6,596,570 | B2 | 7/2003 | Furukawa |
| 10,336,597 | B2 | 7/2019 | Griscik et al. |

(Continued)

FOREIGN PATENT DOCUMENTS

| | | |
|---|---|---|
| CN | 103025646 | 4/2013 |
| CN | 106232518 | 12/2016 |

(Continued)

OTHER PUBLICATIONS

USPTO; Final Office Action dated Jan. 8, 2024 in U.S. Appl. No. 17/458,053.

(Continued)

*Primary Examiner* — Donnell A Long
(74) *Attorney, Agent, or Firm* — SNELL & WILMER L.L.P.

(57) ABSTRACT

A beverage mixing device is may comprise a controller in electronic communication with a sensor, the controller configured to: determine a drink type based on receiving sensor data from the sensor, and mix a pre-mixed composition with a carbonated water or a non-carbonated water based on the drink type.

7 Claims, 10 Drawing Sheets

(56) References Cited

U.S. PATENT DOCUMENTS

| | | | | |
|---|---|---|---|---|
| 10,524,609 | B2 | 1/2020 | Schuh et al. | |
| 10,859,072 | B2 | 12/2020 | Beavis et al. | |
| 2003/0173376 | A1 | 9/2003 | Bilskie et al. | |
| 2017/0081163 | A1 | 3/2017 | Gatipon et al. | |
| 2018/0155663 | A1 | 6/2018 | Peirsman et al. | |
| 2019/0291062 | A1 | 9/2019 | Wood et al. | |
| 2019/0330043 | A1 | 10/2019 | Carpenter et al. | |
| 2020/0146500 | A1 | 5/2020 | Cafaro et al. | |
| 2021/0155465 | A1 | 5/2021 | Crawford et al. | |
| 2021/0262207 | A1* | 8/2021 | Jenkins | E03C 1/02 |
| 2021/0361112 | A1 | 11/2021 | Hobden et al. | |
| 2021/0380392 | A1 | 12/2021 | Glucksman et al. | |
| 2022/0281732 | A1 | 9/2022 | Cole | |

FOREIGN PATENT DOCUMENTS

| | | |
|---|---|---|
| CN | 110312677 | 10/2019 |
| CN | 112074484 | 12/2020 |
| CN | 112218819 | 1/2021 |
| WO | 2013119534 | 8/2013 |
| WO | 2015148710 | 10/2015 |
| WO | 2016178734 | 11/2016 |
| WO | 2018019830 | 2/2018 |
| WO | 2020193376 | 10/2020 |

OTHER PUBLICATIONS

Chinese Patent Office, Chinese Office Action dated Mar. 20, 2024 in Application No. 202211032052.8.

USPTO; Non-Final Office Action dated May 9, 2024 in U.S. Appl. No. 17/458,053.

USPTO; Restriction/Election Requirement dated Aug. 3, 2022 in U.S. Appl. No. 17/458,007.

USPTO; Non-Final Office Action dated Nov. 22, 2022 in U.S. Appl. No. 17/458,007.

European Patent Office, European Partial Search Report dated Jan. 27, 2023 in Application No. 22190866.8.

European Patent Office, European Search Report dated Jan. 23, 2023 in Application No. 22191515.0.

European Patent Office, European Partial Search Report dated Jan. 27, 2023 in Application No. 22190822.1.

USPTO; Notice of Allowance dated May 10, 2023 in U.S. Appl. No. 17/458,007.

European Patent Office, European Search Report dated Apr. 28, 2023 in Application No. 22190866.8.

European Patent Office, European Search Report dated Apr. 28, 2023 in Application No. 22190822.1.

USPTO; Non-Final Office Action dated Jun. 27, 2023 in U.S. Appl. No. 17/458,053.

Chinese Patent Office, Chinese Final Office Action dated Jul. 24, 2024 in Application No. 202211032052.8.

USPTO; Restriction/Election Requirement dated Sep. 15, 2023 in U.S. Appl. No. 17/458,036.

USPTO; Corrected Notice of Allowance dated Aug. 16, 2023 in U.S. Appl. No. 17/458,007.

USPTO; Notice of Allowance dated Jun. 27, 2024 in U.S. Appl. No. 17/458,036.

USPTO; Non-Final Office Action dated Jan. 31, 2024 in U.S. Appl. No. 17/458,036.

USPTO; Advisory Action dated Mar. 15, 2024 in U.S. Appl. No. 17/458,053.

Patent reference listed as Patent No. 6596570 should be 659657. The SB08A form does not allow for a 6-digit Patent Number.

* cited by examiner

BEVERAGE DEVICES, SYSTEMS, AND METHODS

CROSS-REFERENCE TO RELATED APPLICATIONS

This application is divisional of, claims priority to and the benefit of, U.S. patent application Ser. No. 17/458,007, filed Aug. 26, 2021 and titled "BEVERAGE DEVICES, SYSTEMS, AND METHODS," which is incorporated by reference herein in its entirety for all purposes.

FIELD

The present disclosure relates generally to beverage devices, systems, and methods, and, more particularly, to mobile beverage devices systems and methods for use in aircraft cabins.

BACKGROUND

Mixed alcoholic beverage options during flight are limited by stowage space available and time available to serve customers, and/or flight attendants' knowledge of drink mixing. In this regard, passengers may have limited options to single serve bottles that can be purchased by customers. Additionally, current beverage options in aircraft cabins are operated solely by flight attendants or the like, which further limits mixed alcoholic beverage options, due to flight attendants' mixing knowledge, as well as limiting a number of beverages that can be sold on a shorter flight.

SUMMARY

A beverage mixing device is disclosed herein. The beverage mixing device may comprise: a housing; a dispensing head spaced apart from the housing; a nozzle coupled to the dispensing head; a capsule receiver configured to receive a capsule including a pre-mixed composition, the capsule receiver including a first sensor; a water supply tank disposed within the housing; a carbonation vessel disposed within the housing, the carbonation vessel configured for continuous carbonation; and a controller in electronic communication with the first sensor, the controller configured to: determine a drink type based on receiving sensor data from the first sensor, and dispense a carbonated water or a non-carbonated water based on the drink type.

In various embodiments, the beverage mixing device may be mobile. It may also be stationary or installed in an aircraft cabin. The beverage mixing device may further comprise a pump disposed between the water supply tank and a first valve, the controller further configured to activate the first valve to fluidly couple the water supply tank to the carbonation vessel in response to the controller receiving an indication the carbonation vessel is low on water. The first valve may comprise a first inlet, a first outlet, and a second outlet, a first fluid conduit may extend from the second outlet to a first inlet of a second valve, and the second valve may include the first inlet, a second inlet in fluid communication with the carbonation vessel, and a first outlet in fluid communication with the nozzle. The beverage mixing device may further comprise a flow meter disposed between the first outlet of the second valve and the nozzle, the flow meter in electronic communication with the controller. The controller may be further configured to command pumping of water, via the pump, from the water supply tank in response to determining the drink type includes the non-carbonated water for mixing. The controller may be further configured to activate the second valve in response to determining the drink type includes a carbonated water. The pre-mixed composition may be mixed with the carbonated water or the non-carbonated water through the nozzle.

An article of manufacture is disclosed herein. The article of manufacture may include a tangible, non-transitory computer-readable storage medium having instructions stored thereon that, in response to execution by a processor, cause the processor to perform operations comprising: receiving, via the processor, an identifier from a sensor disposed in a beverage mixing device, the sensor configured to capture the identifier on a capsule including a pre-mixed composition; determining, via the processor, a drink type associated with the identifier; commanding, via the processor and through a pump, pumping of a non-carbonated water from a water supply in response to the drink type including the non-carbonated water; receiving, via the processor and through a flow meter, a flow rate of the non-carbonated water being dispensed; and commanding, via the controller, the pump to stop pumping in response to determining a predetermined volume of the water supply has been mixed with the pre-mixed composition, the predetermined volume based on the drink type.

In various embodiments, the operations further comprise activating, via the processor, a valve to fluidly couple a continuous carbonation vessel to a nozzle in response to determining the drink type includes a carbonated water. The operations may further comprise activating a second valve in response to determining a water level is low in the continuous carbonation vessel. The operations may further comprise activating a third valve in response to a dispensing cycle ending, the third valve configured to fluidly couple a carbon dioxide vessel to the nozzle in response to being activated. The operations may further comprise commanding, via the processor, an air pump to pump air through the nozzle. The operations may further comprise receiving a pressure data from a pressure regulator disposed between a carbon dioxide vessel and a continuous carbonation vessel.

A control system for a beverage mixing device is disclosed herein. The control system may comprise: a sensor; a fluid pump; a first valve in fluid communication with the fluid pump; a second valve; and a controller in electronic communication with the fluid pump, the first valve, the second valve, and the sensor, the controller configured to: receive an identifier from the sensor, the sensor configured to capture an identifier on a capsule, the capsule including a pre-mixed composition, the identifier corresponding to a drink type; determine whether the drink type includes a carbonated water or a non-carbonated water; and command the second valve to be energized in response to determining the drink type includes a carbonated water, a continuous carbonation vessel being fluidly coupled to a nozzle in response to the second valve being energized.

In various embodiments, the controller is further configured to command the first valve to be energized in response to determining the continuous carbonation vessel is low on water. The controller may be further configured to command the fluid pump to pump water from a water supply tank in response to determining the drink type includes the non-carbonated water. The control system may be configured to control dispensing the carbonated water or the non-carbonated water through a nozzle of a mixing beverage device. The control system may further comprise a third valve disposed between a carbon dioxide vessel and the nozzle. The controller may be further configured to command the third valve to be energized to fluidly couple the carbon dioxide vessel to the nozzle for dispensing a remainder of fluid in the control system after a drink mixing cycle.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
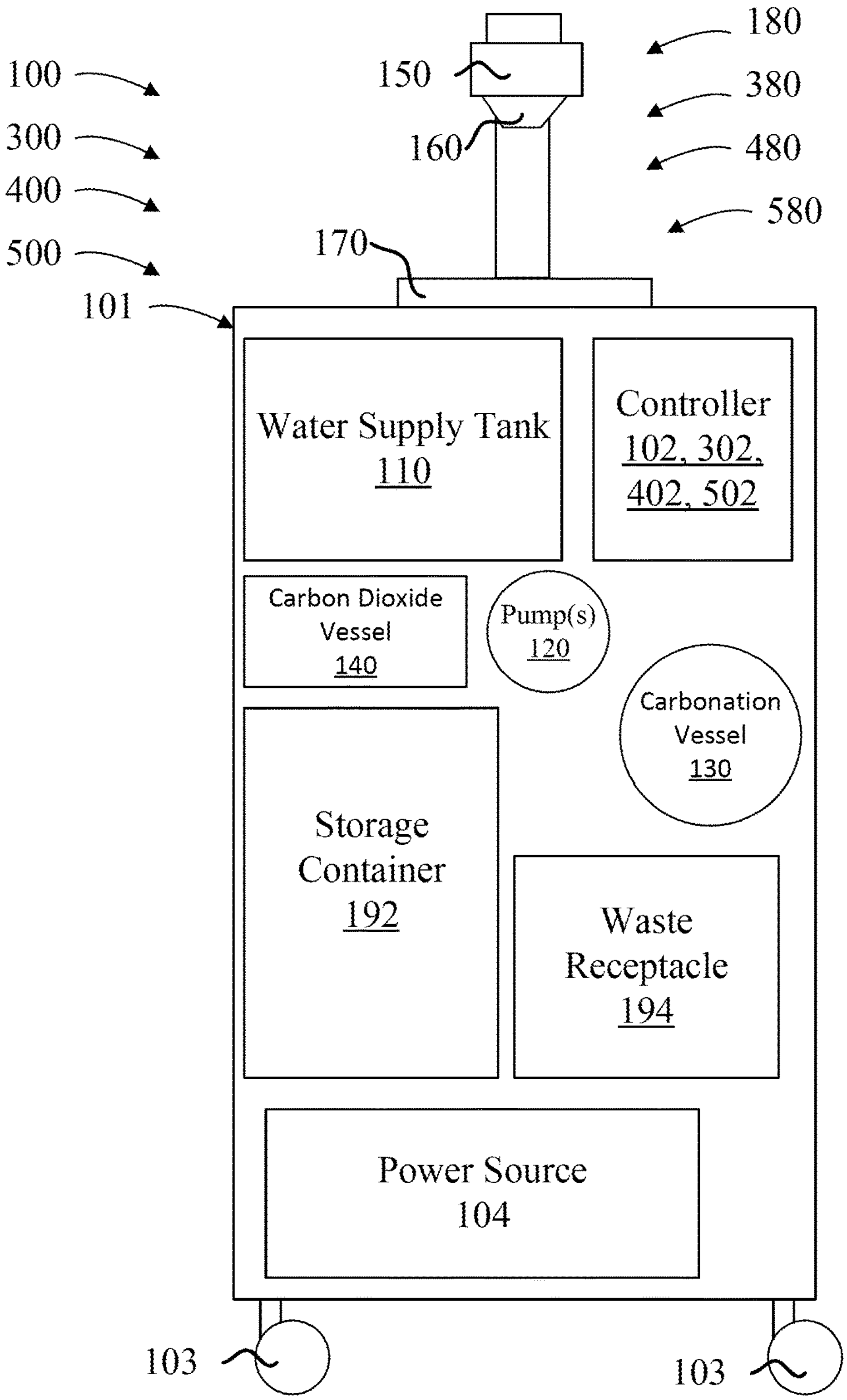
FIG. 1 illustrates a schematic view of a beverage mixing device, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is an alcoholic beverage mixing device for use in aircraft cabins. In various embodiments, the alcoholic beverage mixing device is mobile. Although described herein as being a mobile device, the present disclosure is not limited in this regard. For example, the alcoholic beverage mixing device may be stationary and may be configured to be installed in an aircraft cabin, in accordance with various embodiments. In various embodiments, the alcoholic beverage mixing device may comprise a power source. The power source may be capable of powering the alcoholic beverage mixing device. In various embodiments, the power source may be a rechargeable power source, such as a battery, auxiliary power units, generators, or the like.

In various embodiments, the alcoholic beverage mixing device comprises a dispensing head, a mixing nozzle, a water supply tank, a carbon dioxide tank, a carbonation vessel, pump(s), and a controller. In various embodiments, the controller is configured to perform various operations to mix alcohol and generate a mixed alcoholic drink, as described further herein. In various embodiments, the alcoholic beverage device comprises flavoring concentrates including alcohol.

Currently, alcoholic beverages available in flight are limited to beer, wine, and single serve bottles of distilled spirits (vodka, whiskey, etc.) or liqueur that can be mixed by the customer with another beverage, sometimes referred to as a mixer. The devices disclosed herein allow for the sale of more complex cocktails (mixtures of distilled spirits and mixers) like margaritas, mojitos, long island iced teas, and others, in accordance with various embodiments. In this regard, the devices disclosed herein may provide an additional revenue stream from passengers and/or enhanced amenities for various passengers, in accordance with various embodiments.

Referring now to FIG. 1, a schematic view of an alcoholic beverage mixing device 100, 300, 400, 500 for use in aircraft cabins is illustrated, in accordance with various embodiments. The device 100, 300, 400, 500 comprises housing 101 configured to house a water supply tank 110, pump(s) 120, a carbonation vessel 130, a controller 102, 302, 402, 502 and a power source 104. In various embodiments, the housing 101 may be mobile (e.g., the device 100, 300, 400, 500 may include wheel(s) 103 coupled to the housing 101). Although illustrated as including wheel(s) 103, the present disclosure is not limited in this regard. For example, the housing 101 may be installed in a cabin of an aircraft, in accordance with various embodiments.

In various embodiments, the device 100, 300, 400, 500 further comprises a dispensing head 150, a nozzle 160, a drip tray 170, and a plumbing system 180, 380, 480, 580. During operation, the plumbing system 180, 380, 480, 580 may be in fluid communication with the water supply tank 110, the carbonation vessel 130, and the carbon dioxide vessel 140. In this regard, the plumbing system 180, 380, 480, 580 is configured to transport a mixed drink generated from the device 100, 300, 400, 500 through the nozzle 160 via the plumbing system 180, 380, 480, 580 as described further herein.

In various embodiments, the device 100, 300, 400, 500 further comprises a storage container 192 and a waste receptacle 194. Although illustrated as comprising the storage container 192 and the waste receptacle 194, the present disclosure is not limited in this regard. For example, for a stationary application a storage container 192 and/or a waste receptacle 194 may be eliminated, in accordance with various embodiments. In various embodiments, the storage container 192 may be configured to house drink pods (i.e., a pre-mixed flavor concentration and an alcoholic beverage), such as a whiskey and syrup concentrate, or the like.

Figure 2:
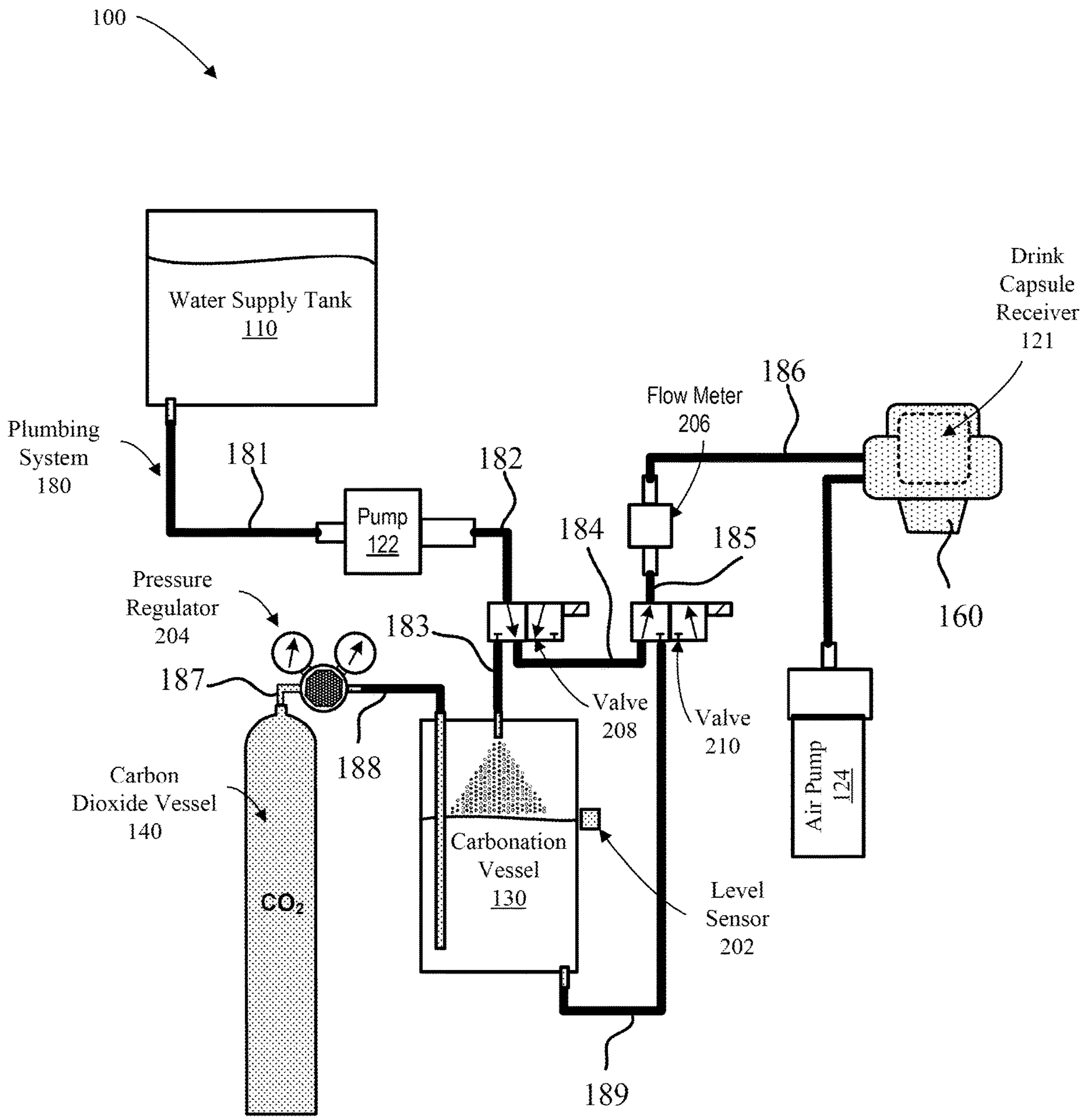
FIG. 2 illustrates a plumbing system for a beverage mixing device, in accordance with various embodiments.

Referring now to FIG. 2, a schematic view of the device 100 from FIG. 1 is illustrated, in accordance with various embodiments. In various embodiments, the device 100 further comprises a drink capsule receiver 121. The drink capsule receiver 121 may be configured to receive a drink capsule containing a pre-mixed composition, in accordance with various embodiments. In various embodiments, the pre-mixed composition may include a flavoring (e.g., in powder form, a syrup, or the like) and an alcohol (e.g., whiskey, vodka, gin, rum, tequila, etc.). In various embodiments, the pre-mixed composition may be sealed within the drink capsule and the device 100 may be configured to break the seal of the drink capsule (e.g., by puncturing the seal via an actuated pin, or the like). The present disclosure is not limited in this regard. Any means for breaking a seal for a pre-mixed composition is within the scope of this disclosure.

The plumbing system 180 of device 100 includes various fluid conduits configured to transfer fluid throughout the plumbing system 180 as disclosed further herein. In various embodiments, the plumbing system 180 comprises a first fluid conduit 181 extending from a water supply tank 110 to a pump 122. The pump 122 may comprise an electrically activated pump (i.e., the pump 122 may be configured to convert electrical energy to mechanical energy). In various embodiments, in response to receiving electrical energy from the power source 104 from FIG. 1, the pump 122 is configured to pump water from the water supply tank 110 through the first fluid conduit 181 and out an outlet of the pump 122 towards a first valve 208 via a second fluid conduit. In various embodiments, the first valve 208 comprises an inlet, a first outlet and a second outlet. In various embodiments, the first valve 208 is in fluid communication with the second outlet in an un-energized state. Although illustrated as being in fluid communication with the second outlet of the first valve 208 in the un-energized state and in fluid communication with the first outlet of the first valve 208 in an energized state, the present disclosure is not limited in this regard. For example, the first valve 208 could be in fluid communication with the first outlet of the first valve 208 in the un-energized state. In various embodiments, the first valve 208 is a solenoid valve. In this regard, in response to being energized (i.e., an electrical coil receiving current therethrough), a plunger may be actuated to close the second outlet of the first valve 208 and open the first outlet of the first valve 208, in accordance with various embodiments.

The first outlet of the first valve 208 is in fluid communication with the carbonation vessel 130 via a third fluid conduit 183. The second outlet of the first valve 208 is in fluid communication with a first inlet of a second valve 210 via a fourth fluid conduit 184. In various embodiments, the second valve 210 comprises the first inlet, a second inlet, and an outlet. In various embodiments, the first inlet of the second valve 210 is in fluid communication with the outlet of the second valve 210 in an un-energized state. Although illustrated as being the first inlet of the second valve 210 being in fluid communication with the outlet in the un-energized state and the second inlet being in fluid communication with the outlet of the second valve 210 in an energized state, the present disclosure is not limited in this regard. For example, the second inlet of the second valve 210 could be in fluid communication with the outlet of the second valve 210 in the un-energized state, in accordance with various embodiments. In various embodiments, the second valve 210 is a solenoid valve.

In various embodiments, the outlet of the second valve 210 is in fluid communication with a flow meter 206 via a fifth fluid conduit 185. The flow meter 206 is in fluid communication with the nozzle 160 via a sixth fluid conduit 186 of the device 100. In this regard, as described further herein, in response to a controller determining a drink to be mixed is not a carbonated drink, the controller may command the pump 122 to pump water through fluid conduits 181, 182, 184, 185, 186 and out the nozzle 160 combined with a premixed composition of a respective drink capsule as defined further herein.

In various embodiments, the carbon dioxide vessel 140 is in fluid communication with a pressure regulator 204. In various embodiments, the pressure regulator 204 may be coupled directly to the carbon dioxide vessel 140, may be integral with the carbon dioxide vessel 140, or may be in fluid communication through a seventh fluid conduit 187. The present disclosure is not limited in this regard. The pressure regulator comprises a valve configured to control a pressure of the carbon dioxide supplied to the carbonation vessel 130. In this regard, based on a command from a controller 102 from FIG. 1, the pressure of the carbon dioxide supplied to the carbonation vessel 130 may be regulated based on a respective drink capsule as disclosed further herein.

In various embodiments, the pressure regulator 204 is in fluid communication with the carbonation vessel 130 via an eighth fluid conduit 188. In various embodiments, the carbonation vessel 130 may be configured for continuous carbonation. In this regard, the carbon dioxide vessel 140 may be constantly providing carbon dioxide into the carbonation vessel 130 during operation of the device 100. In various embodiments, a sensor 202 may be operably coupled to the carbonation vessel 130 configured to measure a level of fluid disposed in the carbonation vessel 130. In this regard, the level sensor may be configured to provide an input as to a height of fluid disposed in the carbonation vessel 130 to provide an indication when the carbon dioxide vessel 140 is low on water, in accordance with various embodiments. In this regard, the carbonation vessel 130 may be a continuous carbonation vessel. Thus, once water recedes below a predetermined level, as determined by the controller 102 from FIG. 1 based on a measurement of the sensor 202, water from the water supply tank 110 may be supplied to the carbonation vessel 130 (i.e., via energizing first valve 208), and pumping water from the water supply tank 110 via pump 122.

In various embodiments, the carbonation vessel 130 is in fluid communication with the second input of the second valve 210 via a ninth fluid conduit 189. In various embodiments, in response to a controller determining a drink to be mixed is a carbonated drink, the controller 102 from FIG. 1 may energize the first valve 208 and the second valve 210, command the pump 122 to pump water through fluid conduits 181, 182, 183 into the carbonation vessel 130 to form a carbonated water, pump the carbonated water from the carbonation vessel 130 through fluid conduits 189, 185, 186 and out the nozzle 160, and combine the carbonated water with a premixed composition of a respective drink capsule at the nozzle 160 as defined further herein.

Although illustrated as having the flow meter 206 disposed between the second valve 210 and the nozzle 160, the present disclosure is not limited in this regard. For example, the flow meter 206 may be disposed in the first fluid conduit 181, the second fluid conduit 182, or two flow meters utilized (e.g., one in fourth fluid conduit 184 and one in third fluid conduit 183 or the like), in accordance with various embodiments.

In various embodiments, the device 100 comprises an air pump 124 in fluid communication with the nozzle 160. In this regard, the air pump 124 may be configured to provide a positive pressure to push a remaining fluid out the nozzle 160 proximate an end of a dispensing cycle, in accordance with various embodiments. Although illustrated as comprising the air pump 124, the present disclosure is not limited in this regard. For example, with brief reference to FIG. 3, the air pump 124 may be replaced by fluidly coupling the carbon dioxide vessel to a third valve 310 through a second pressure regulator 304 of device 300. In various embodiments, device 300 is in accordance with device 100, where like numerals denote like elements of device 100. In various embodiments, the third valve 310 may be in closed in an un-energized state and opened in an energized state. In this regard, in response to nearing an end of a dispensing cycle, a portion of the carbon dioxide may be routed to the nozzle 160 to push a remaining fluid out the nozzle 160, in accordance with various embodiments.

Although illustrated as providing continuous carbonation, the present disclosure is not limited in this regard. For example, with reference now to FIG. 4, a schematic view of a device 400 with a plumbing system 480 configured for on-demand carbonation is illustrated, where like numerals denote like elements of device 100. In various embodiments, the flow meter 206 from device 100 may be moved from between second valve 210 and nozzle 160 to being between the water supply tank 110 (i.e., fluidly coupled via fluid conduit 481) and the pump 122 (i.e., fluidly coupled via fluid conduit 482), and a pressure transducer 403 may be coupled to the ninth fluid conduit 189 extending from an on-demand carbonation vessel 430 and the second valve 210. Thus, a single conduit 485 may extend from the second valve 210 to the nozzle 160. In this regard, flow meter 206 and the pressure transducer 403 may provide inputs to the controller 402 from FIG. 1 to regulate a pressure of pump 122 for a drink being carbonated on-demand based on a respective carbonation level for the drink, in accordance with various embodiments.

In various embodiments, a third valve 408 may be disposed between the pressure regulator 204 (i.e., fluidly coupled via fluid conduit 488) and the on-demand carbonation vessel 430 (i.e., fluidly coupled via fluid conduit 489). In various embodiments, the third valve 408 may be closed in an un-energized state and opened in an energized state. In this regard, a default state of the third valve 408 may correspond to a drink being generated that is non-carbonated, whereas in response to the controller 102 from FIG. 1 determining a drink is to be carbonated, the third valve 408 may be energized to open the third valve 408 and fluidly couple the carbon dioxide vessel 140 to the on-demand carbonation vessel 430.

In various embodiments, the device 400 further comprises a first exhaust fluid conduit 490 extending from the on-demand carbonation vessel 430 to an input of a fourth valve 404 and a second exhaust fluid conduit 491 extending from an output of the fourth valve 404 to an output port. In various embodiments, the fourth valve 404 is closed in an un-energized state and opened in an energized state. In this regard, in response to a drink dispensing cycle being finished, any remaining carbon dioxide in the on-demand carbonation vessel 430 may be exhausted through the output port of the second exhaust fluid conduit 491.

Although illustrated with devices 100, 300, 400 being configured to receive a drink capsule, the present disclosure is not limited in this regard. For example, with reference now to FIG. 5, a schematic view of a device 500 with a plumbing system 580 configured for a plurality of bulk pre-mixed compositions 510 is illustrated, where like numerals denote like elements of device 100. In various embodiments, the device 500 comprises a plurality of bulk pre-mixed compositions 510, each bulk pre-mixed composition stored in a respective container. In various embodiments, the bulk pre-mixed compositions 510 include alcohol and a flavoring concentrate, such as a powder composition, a syrup composition, or the like. In various embodiments, the bulk pre-mixed compositions may include alcohol disposed separately from the flavoring concentrate and configured to be mixed/dispensed together in response to dispensing the bulk pre-mixed composition (e.g., bulk premixed composition 512 or bulk pre-mixed composition 514).

Although illustrated as including a first bulk pre-mixed composition 512 and a second pre-mixed composition 514, the present disclosure is not limited in this regard. For example, any number of bulk premixed compositions for the device 100 is within the scope of this disclosure. In various embodiments, each pre-mixed composition may be associated with a respective pump in fluid communication with the nozzle 160. In this regard, in response to the controller 502 from FIG. 1 receiving a drink selection, the controller may command a respective pump (e.g., pump 522 in response to a user selecting a drink associated with the bulk pre-mixed composition 512), to dispense a predetermined amount of the bulk pre-mixed composition 512 to the nozzle 160 to be mixed with one of a non-carbonated water or a carbonated water as described previously herein. Although illustrated as a pump for each bulk pre-mixed composition, the present disclosure is not limited in this regard. For example, instead of pump 522 being associated with bulk pre-mixed composition 512 and pump 524 being associated with pump 524, a single pump may be utilized and a valve may be configured to open or close as described previously herein to fluidly couple a selected bulk pre-mixed composition to the nozzle 160, in accordance with various embodiments.

Although device 500 is illustrated as having a carbonation system in accordance with device 100, the present disclosure is not limited in this regard. For example, the device 500 may include a carbonation system in accordance with device 300 or device 400, in accordance with various embodiments. In this regard, the carbonation system of device 500 may be configured to utilize the carbon dioxide in the carbon dioxide vessel 140 to push a remaining fluid out the nozzle 160 in accordance with device 300, or may include an on-demand carbonation vessel 430 in accordance with device 400, in accordance with various embodiments. The present disclosure is not limited in this regard.

Figure 6:
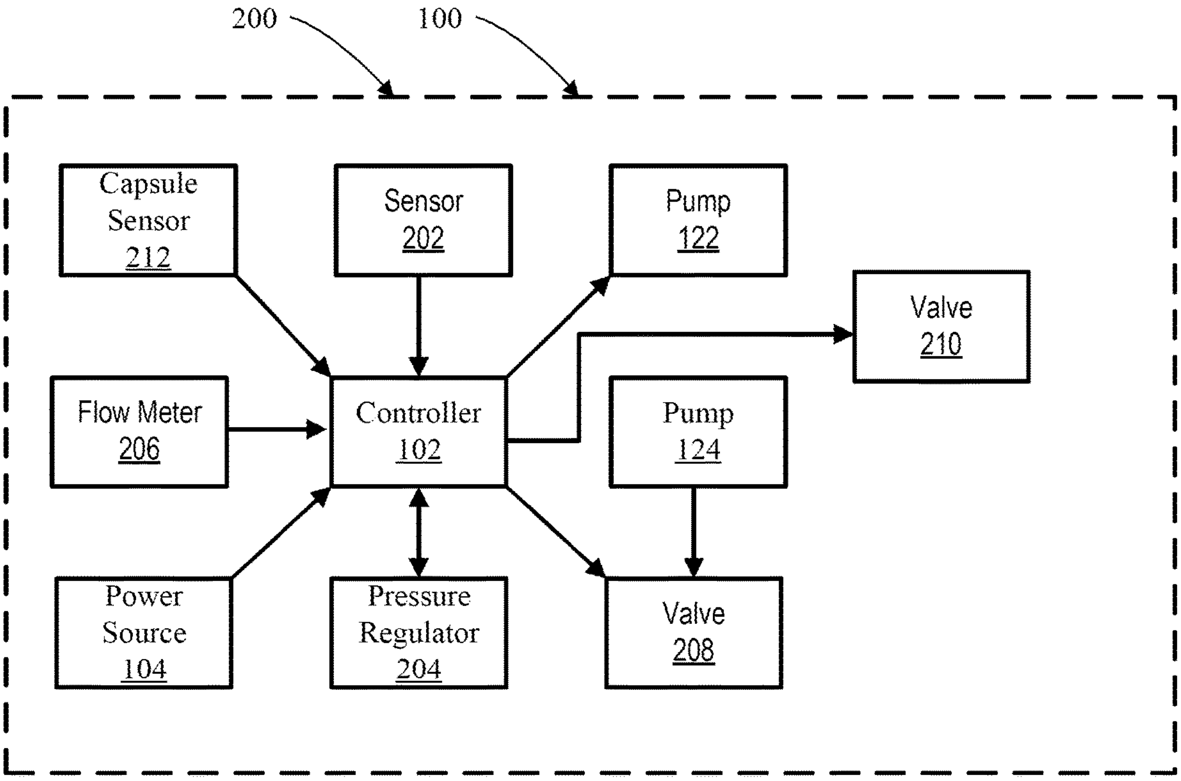
FIG. 6 illustrates a control system for a beverage mixing device, in accordance with various embodiments.

Referring now to FIG. 6, a schematic view of a control system 200 for the device 100 from FIGS. 1 and 2 is illustrated, in accordance with various embodiments. In various embodiment, the control system 200 comprises the controller 102 of device 100 from FIG. 1. In various embodiments, controller 102 may be configured as a central network element or hub to access various systems and components of control system 200. In various embodiments, controller 102 may comprise a processor. In various embodiments, controller 102 may be implemented in a single processor. In various embodiments, controller 102 may be implemented as and may include one or more processors and/or one or more tangible, non-transitory memories (e.g., memory) and be capable of implementing logic. Each processor can be a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof. Controller 102 may comprise a processor configured to implement various logical operations in response to execution of instructions, for example, instructions stored on a non-transitory, tangible, computer-readable medium configured to communicate with controller 102.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the controller 102 is in electronic communication (e.g., wirelessly or electrically) with the sensor 202, a capsule sensor 212, the flow meter 206, the pressure regulator 204 and the power source 104 of device 100. In various embodiments, the controller 102 is configured to receive data from the sensor 202, the pressure regulator 204, the flow meter 206, and the capsule sensor 212. In this regard, the controller 102 may command power source 104 to provide electrical power to various components in response to data received during operation of the device 100 as described further herein. With combined reference to FIG. 2 through 5, the capsule sensor 212 may be disposed in the drink capsule receiver 121. In this regard, the capsule sensor 212 is configured to provide drink data to the controller 102 for the controller to act on. In various embodiments, the capsule sensor 212 may comprise a radio frequency identification ("RFID") reader, a camera, a scanner, or the like. Thus, a drink capsule may comprise a drink identifier that the capsule sensor 212 is configured to read, such as an RFID tag, a barcode, or the like.

Figure 3:
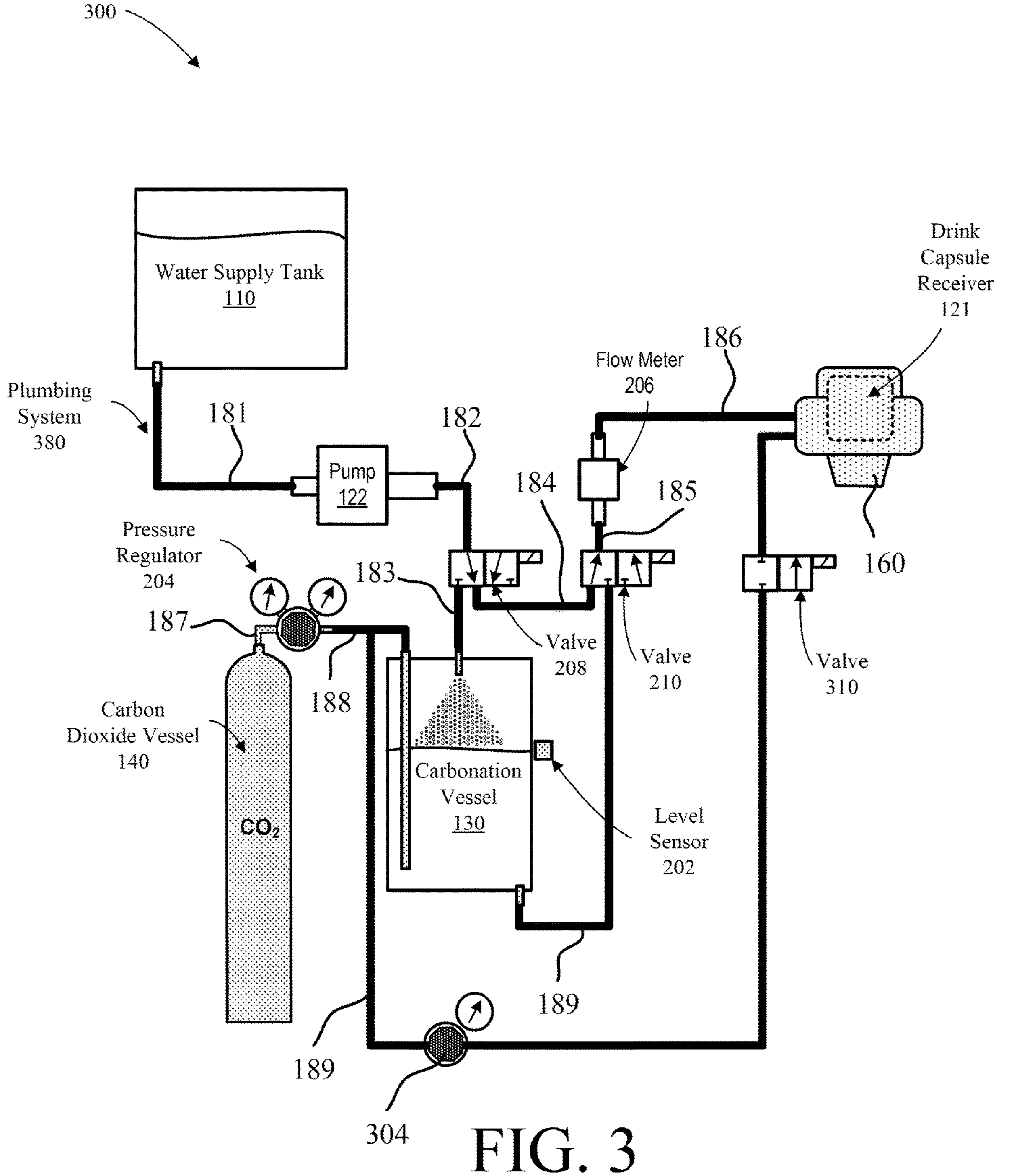
FIG. 3 illustrates a plumbing system for a beverage mixing device, in accordance with various embodiments.
Figure 7:
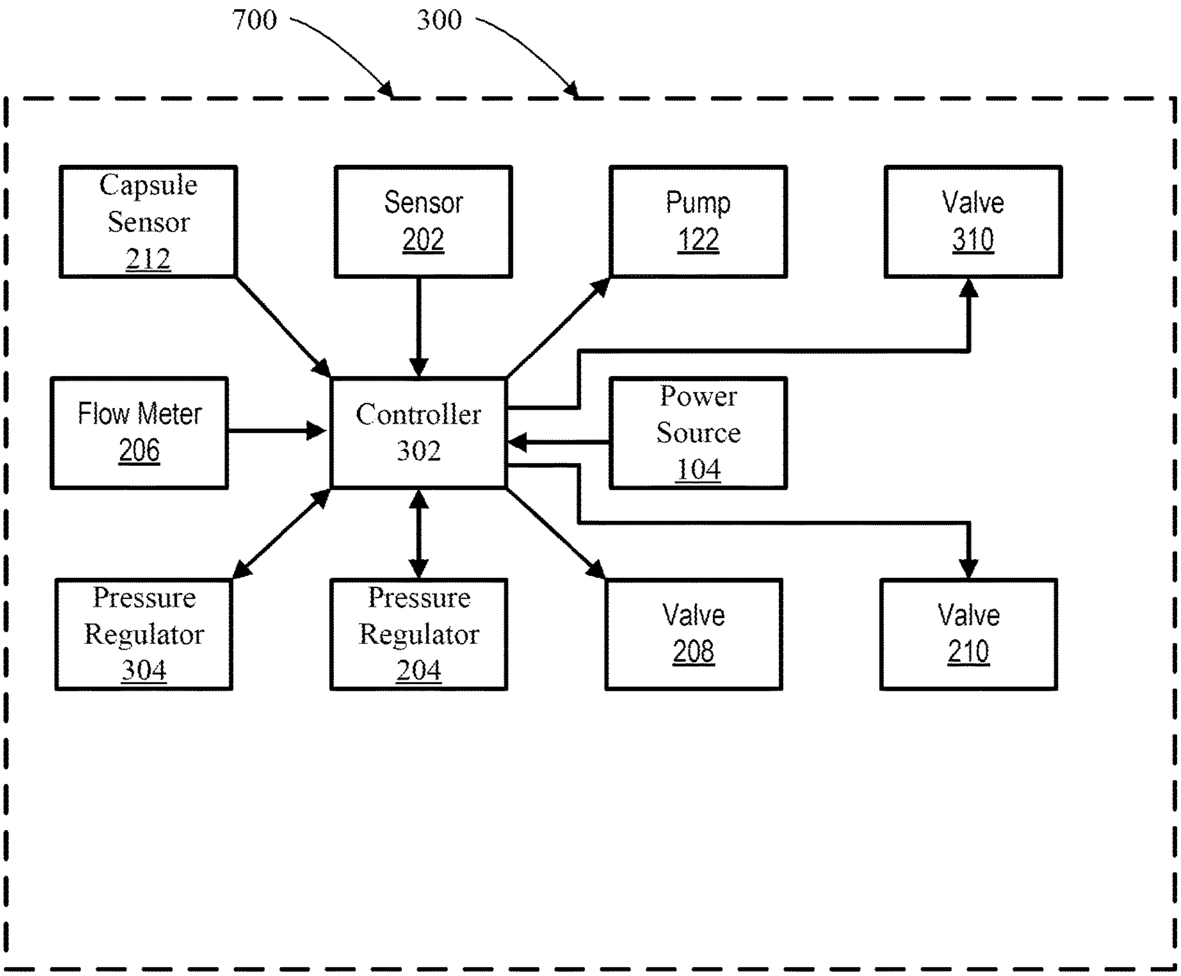
FIG. 7 illustrates a control system for a beverage mixing device, in accordance with various embodiments.

Referring now to FIG. 7, a control system 700 for the device 300 from FIGS. 1 and 3 is illustrated, where like numerals denote like elements of control system 200 from FIG. 6, in accordance with various embodiments. In various embodiments, the control system 700 comprises a controller 302. The controller 302 is in accordance with the controller 102 except as otherwise described herein. In various embodiments, the control system 700 is in accordance with control system 200 with the exception that air pump 124 is removed, the pressure regulator 304 is added and the third valve 310 is added. In various embodiments, the pressure regulator 304 is in electronic (i.e., electrical or wireless) communication with the controller 302. In this regard, the pressure regulator 304 is configured to provide data to the controller as to a pressure being measured between the carbon dioxide vessel 140 and the nozzle 160 of device 300 from FIG. 3, in accordance with various embodiments. In this regard, the controller 302 may be configured to monitor and regulate the pressure in response to the data, in accordance with various embodiments.

In various embodiments, the third valve 310 is in electrical communication with the controller 302. In this regard, in response to the controller 302 determining a dispensing cycle has ended (i.e., by deactivating pump 122), a remaining fluid may be pushed out of the nozzle 160 of device 300 from FIG. 3 in response to the controller 302 commanding the power source to energize the third valve 310, in accordance with various embodiments.

Figure 4:
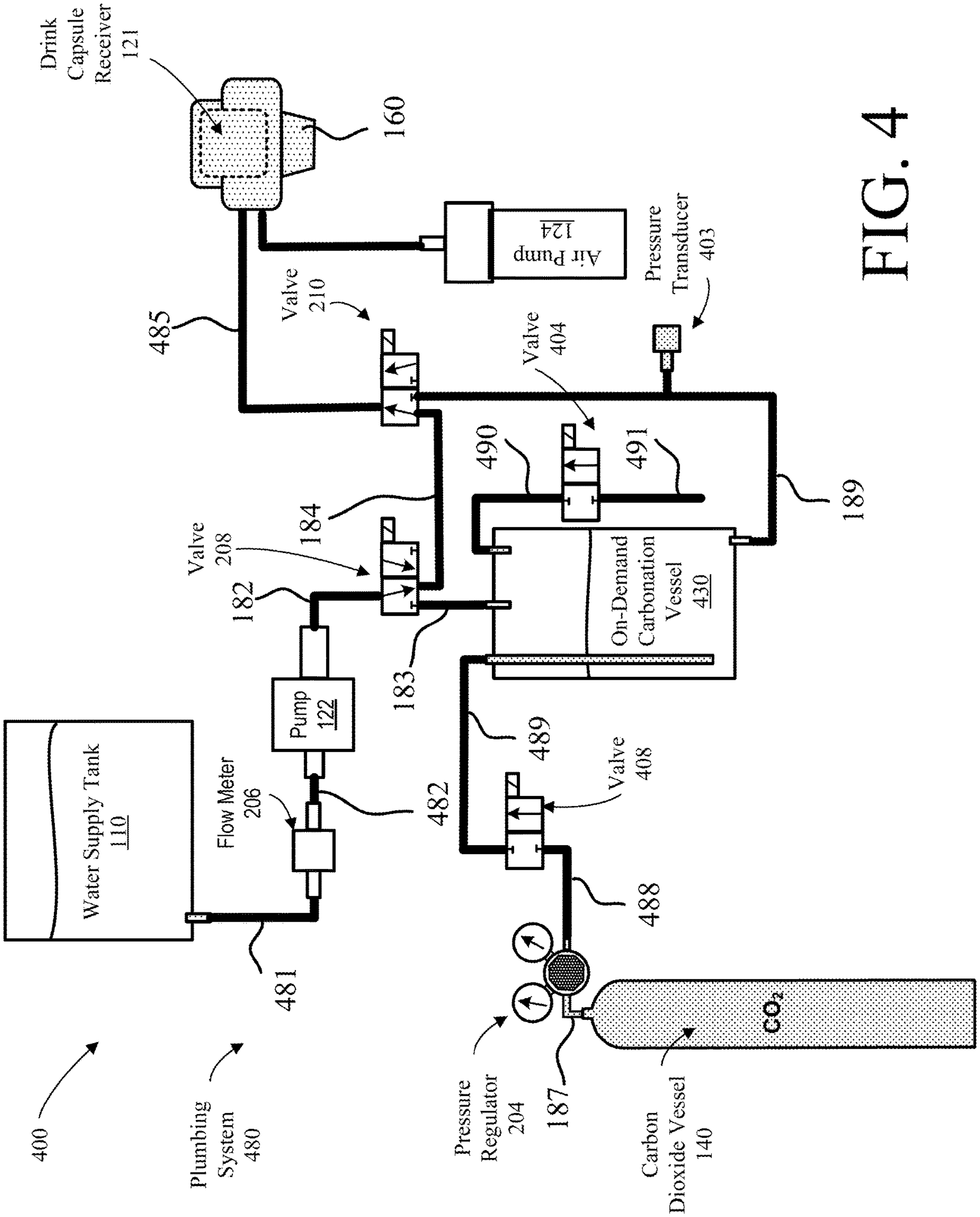
FIG. 4 illustrates a plumbing system for a beverage mixing device, in accordance with various embodiments
Figure 8:
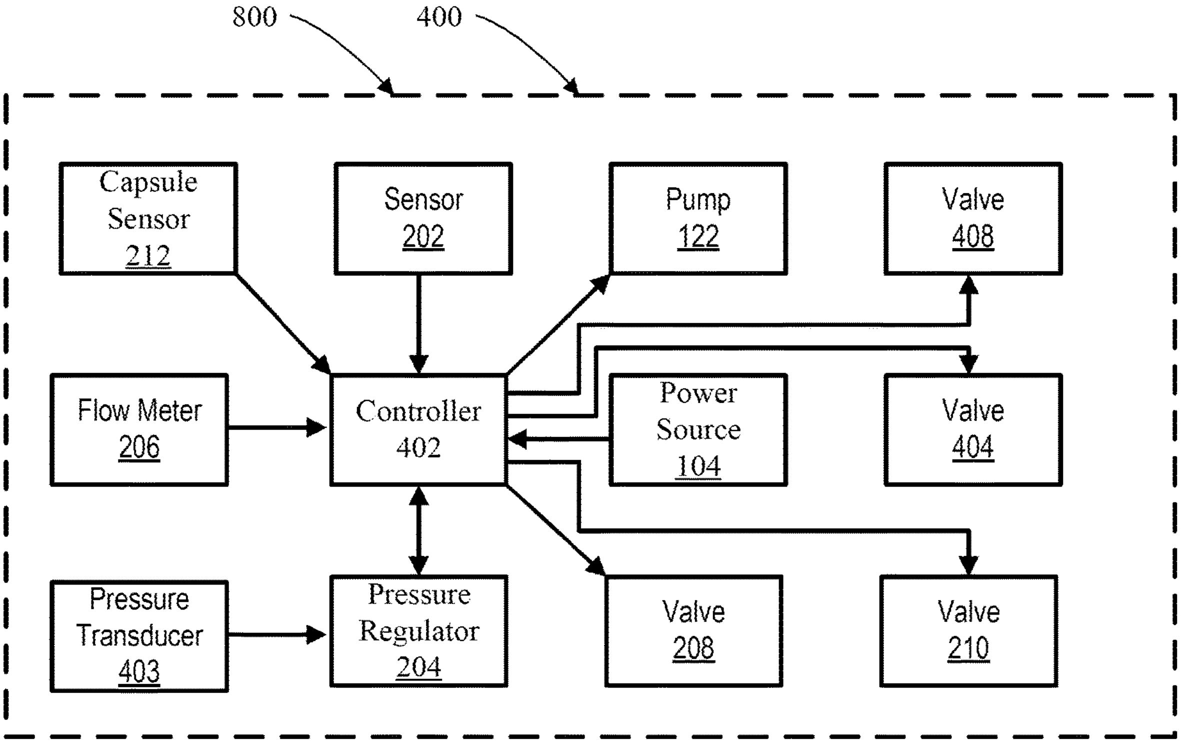
FIG. 8 illustrates a control system for a beverage mixing device, in accordance with various embodiments.

Referring now to FIG. 8, a control system 800 for the device 400 from FIGS. 1 and 4 is illustrated, where like numerals denote like elements of control system 200 from FIG. 6, in accordance with various embodiments. In various embodiments, the control system 800 comprises a controller 402. The controller 402 is in accordance with the controller 102 except as otherwise described herein. In various embodiments, the control system 800 is in accordance with control system 200 with the exception that control system 800 further comprises the third valve 408 and the fourth valve 404. In various embodiments, the third valve 408 and the fourth valve 404 are in electrical communication with the power source 104. In this regard, the controller 402 is configured to open the third valve 408 by energizing the third valve 408 in response to determining a respective beverage to be mixed is to be carbonated. In this regard, the controller 402 may control the pressure regulator 204 to control an amount of carbon dioxide to supply to the on-demand carbonation vessel 430 of device 400 from FIG. 4 and de-energize the third valve 408 upon completing a dispensing cycle, in accordance with various embodiments. Similarly, the controller 402 is configured to command (e.g., through the power source 104) energizing fourth valve 404 to exhaust carbon dioxide from the on-demand carbonation vessel 430 of device 400 from FIG. 4 in response to completing the dispensing cycle, in accordance with various embodiments.

Figure 5:
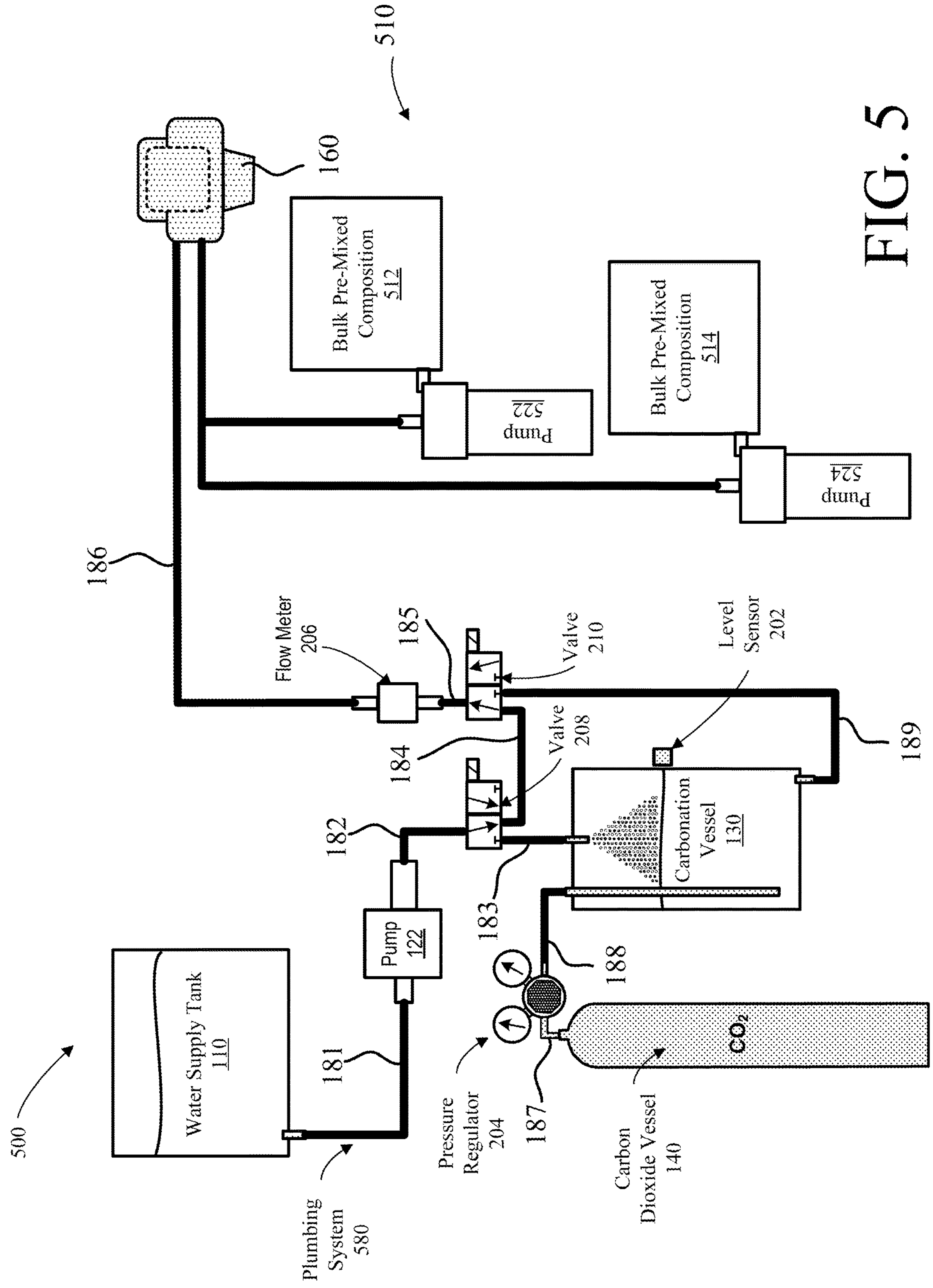
FIG. 5 illustrates a plumbing system for a beverage mixing device, in accordance with various embodiments
Figure 9:
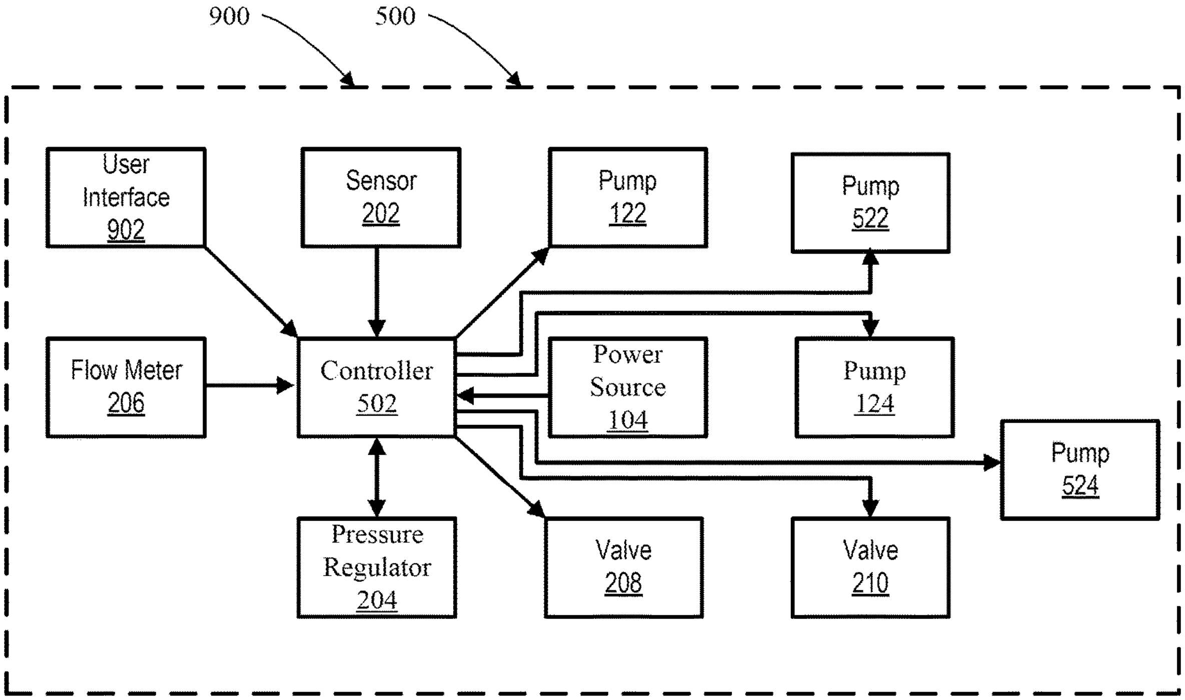
FIG. 9 illustrates a control system for a beverage mixing device, in accordance with various embodiments.

Referring now to FIG. 9, a control system 900 for the device 500 from FIGS. 1 and 5 is illustrated, where like numerals denote like elements of control system 200 from FIG. 6, in accordance with various embodiments. In various embodiments, the control system 900 comprises a controller 502. The controller 502 is in accordance with the controller 102 except as otherwise described herein. In various embodiments, the control system 900 is in accordance with control system 200 with the exception that control system 900 does not include the capsule sensor 212 and further comprises pumps 522, 524 and a user interface 902. In various embodiments, the user interface 902 includes a graphical user interface which may be accessible by a display device via an application, web browser, software application, or the like. In various embodiments, since the pre-mixed compositions are disposed within the housing 101 of FIG. 1, a capsule sensor 212 is not used. In this regard, a user may select a drink from a list of mixed drinks for the device 500 from FIG. 5. In response to selecting a mixed drink from the user interface 902, the controller may determine a bulk pre-mixed composition from a plurality of bulk pre-mixed compositions 510 from FIG. 5 from which to dispense through nozzle 160 of device 500, in accordance with various embodiments. In this regard, the controller 502 may activate a pump (e.g., pump 522 or pump 524) associated with a respective bulk pre-mixed composition (e.g., bulk pre-mixed composition 512 or bulk pre-mixed composition 514), in accordance with various embodiments.

Figure 10:
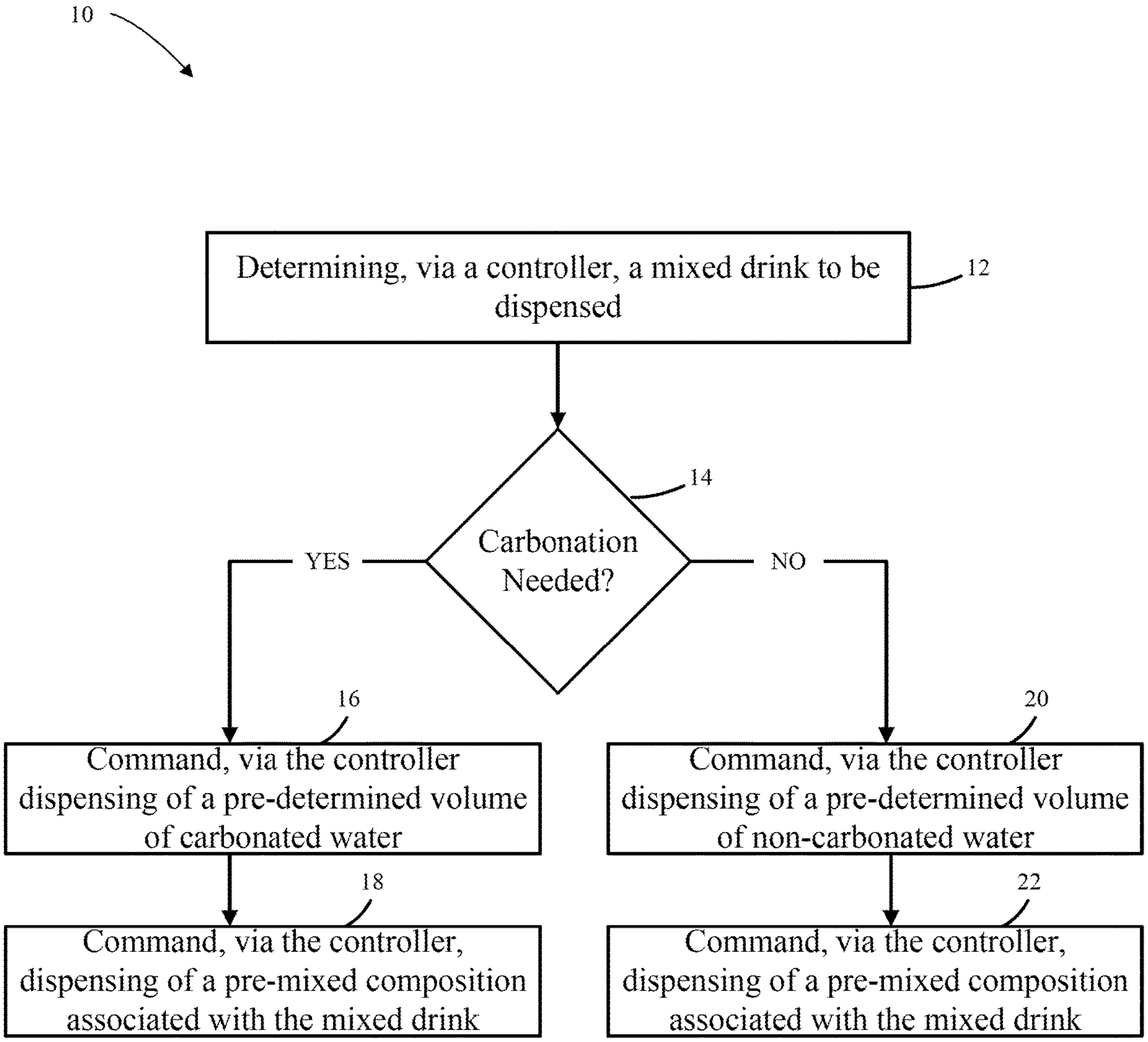
FIG. 10 illustrates a process for a control system for an beverage mixing device.

Referring now to FIG. 10, a flow chart for a process 10 of dispensing a mixed drink via a control system 200, 700, 800, 900, is illustrated, in accordance with various embodiments. The process 10 comprises determining via a controller, a mixed drink to be dispensed (step 12). In various embodiments, determining the mixed drink may be based on receiving an identifier from a capsule sensor (e.g., capsule sensor 212 of control systems 200, 700, 800) as disclosed previously herein. In various embodiments, determining the mixed drink may be based on receiving a selected drink from a user interface (e.g., user interface 902 from control system 900).

In various embodiments, the process 10 further comprises determining whether the mixed drink to be dispensed includes carbonation (step 14). In various embodiments, each identifier for a mixed drink in accordance with control systems 200, 700, 800 and each selectable drink from a user interface in accordance with control system 900 may include the following data: carbonation data (i.e., carbonated or not), volume data (i.e., a volume of water or carbonated water to be dispensed), or the like.

In various embodiments, the process 10 further comprises commanding, via the controller, dispensing of a pre-determined volume of carbonated water in response to determining the mixed drink is a carbonated mixed drink (step 16).

In various embodiments, control systems 200, 700 may dispense carbonated water in accordance with step 16 from the carbonation vessel 130 which is continuously carbonated as described previously herein. In this regard, the second valve 210 may be energized by the controller 102, 302 of the control system 200, 700, pressure from the carbonation vessel 130 may propel the carbonated water out the nozzle 160 of the device 100, 300, and the flow meter 206 may provide data to the controller 102, 302 to ensure the volume of carbonated water is in accordance with the mixed drink of step 12.

In various embodiments, the control system 800 may energize, via a command from the controller 402, the first valve 208 and the fourth valve 404 (i.e., to provide a vent during filling of the on-demand carbonation vessel). The control system 800 may proceed to fill the on-demand carbonation vessel 430 with a predetermined volume of water associated with a drink being dispensed. The control system 800 may fill the on-demand carbonation vessel 430 based on data received from the flow meter 206. In various embodiments, once the predetermined volume of water is disposed in the on-demand carbonation vessel 430, the controller 402 may de-energize the pump 122, the valve 208, and the third valve 404. The controller 402 may further energize valve 408 to pressurize the on-demand carbonation vessel 430 to a predetermined pressure. In this regard, pressure transducer 403 may provide pressure data to the controller 402 to ensure the pressure of the on-demand carbonation vessel 430 meets the predetermined pressure. In various embodiments, in response to the predetermined pressure being met or exceeded, the controller 402 may de-energize valve 408 and energize valve 210 to dispense the carbonated water.

In this regard, carbonated water may be formed in the on-demand carbonation vessel 430 by regulating, via the pump 122 (in response to controller receiving data from flow meter 206) and pressure regulator 204 and an amount of water supplied from water supply tank 110 and an amount of carbon dioxide supplied from carbon dioxide vessel 140, in accordance with various embodiments. In various embodiments, the pressure transducer 403 may provide pressure data to the controller 402.

In various embodiments, the control system 900 may dispense the carbonated water in accordance with control system 200, control system 700, or control system 800 as outlined above.

In various embodiments, the process 10 further comprises commanding, via the controller, dispensing of a pre-mixed composition associated with the mixed drink (step 18). In various embodiments, the pre-mixed composition may be dispensed via the dispensing head 150 from FIG. 1 by breaking a seal of a drink capsule (e.g., for control systems 200, 700, 800) or by activating a pump (e.g., pump 522 or pump 524 of device 500) associated with the pre-mixed composition (e.g., bulk pre-mixed composition 512 or bulk pre-mixed composition 514 of device 500), in accordance with various embodiments. In various embodiments, steps 16 and 18 may be performed simultaneously. In various embodiments, the bulk pre-mixed composition associated with the mixed drink may be configured to release a pre-determined volume of the pre-mixed composition prior to pumping the pre-mixed composition through the nozzle 160, in accordance with various embodiments.

In various embodiments, the process 10 further comprises commanding, via the controller, dispensing of a pre-determined volume of non-carbonated water in response to determining the mixed drink is a non-carbonated mixed drink (step 20). In this regard, the controller 102, 302, 402, 502 may command the pump 122 to pump a pre-determined volume of water through the nozzle 160. In various embodiments, the controller 102, 302, 402, 502 may monitor the amount of non-carbonated water being dispensed via flow meter 206.

In various embodiments, the process 10 further comprises commanding, via the controller, dispensing of the pre-mixed composition associated with the mixed drink (step 22). In various embodiments, step 22 may be similar to step 18 as described above. For example, the pre-mixed composition may be dispensed via the dispensing head 150 from FIG. 1 by breaking a seal of a drink capsule (e.g., for control systems 200, 700, 800) or by activating a pump (e.g., pump 522 or pump 524 of device 500) associated with the pre-mixed composition (e.g., bulk pre-mixed composition 512 or bulk pre-mixed composition 514 of device 500), in accordance with various embodiments. In various embodiments, steps 20 and 22 may be performed simultaneously. In various embodiments, the bulk pre-mixed composition associated with the mixed drink may be configured to release a pre-determined volume of the pre-mixed composition prior to pumping the pre-mixed composition through the nozzle 160, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An article of manufacture including a tangible, non-transitory computer-readable storage medium having instructions stored thereon that, in response to execution by a processor, cause the processor to perform operations comprising:

receiving, via the processor, an identifier from a sensor disposed in a beverage mixing device, the sensor configured to capture the identifier on a capsule including a pre-mixed composition;

determining, via the processor, a drink type associated with the identifier;

commanding, via the processor and through a pump, pumping of a non-carbonated water from a water supply in response to the drink type including the non-carbonated water;

receiving, via the processor and through a flow meter, a flow rate of the non-carbonated water being dispensed;

receiving a pressure data from a pressure regulator disposed between a carbon dioxide vessel and a continuous carbonation vessel; and commanding, via the processor, the pump to stop pumping in response to determining a predetermined volume of the water supply has been mixed with the pre-mixed composition, the predetermined volume based on the drink type.

2. The article of manufacture of claim 1, wherein the operations further comprise activating, via the processor, a valve to fluidly couple the continuous carbonation vessel to a nozzle in response to determining the drink type includes a carbonated water.

3. The article of manufacture of claim 2, wherein the operations further comprise activating a first valve in response to determining a water level is low in the continuous carbonation vessel.

4. The article of manufacture of claim 3, wherein the operations further comprise activating a second valve in response to a dispensing cycle ending, the second valve configured to fluidly couple the carbon dioxide vessel to the nozzle in response to being activated.

5. The article of manufacture of claim 4, wherein the operations further comprise commanding, via the processor, an air pump to pump air through the nozzle.

6. An article of manufacture including a tangible, non-transitory computer-readable storage medium having instructions stored thereon that, in response to execution by a processor, cause the processor to perform operations comprising:

receiving, via the processor, an identifier from a sensor disposed in a beverage mixing device, the sensor configured to capture the identifier on a capsule including a pre-mixed composition;

determining, via the processor, a drink type associated with the identifier;

commanding, via the processor and through a pump, pumping of a non-carbonated water from a water supply in response to the drink type including the non-carbonated water;

receiving, via the processor and through a flow meter, a flow rate of the non-carbonated water being dispensed;

commanding, via the processor, the pump to stop pumping in response to determining a predetermined volume of the water supply has been mixed with the pre-mixed composition, the predetermined volume based on the drink type;

activating, via the processor, a valve to fluidly couple a continuous carbonation vessel to a nozzle in response to determining the drink type includes a carbonated water;

activating, via the processor, a first valve in response to determining a water level is low in the continuous carbonation vessel; and activating, via the processor, a second valve in response to a dispensing cycle ending, the second valve configured to fluidly couple a carbon dioxide vessel to the nozzle in response to being activated.

7. The article of manufacture of claim 6, wherein the operations further comprise commanding, via the processor, an air pump to pump air through the nozzle.

* * * * *